(12) United States Patent  (10) Patent No.: US 7,567,688 B2
Nagaoka et al.  (45) Date of Patent: Jul. 28, 2009

(54) APPARATUS FOR AND METHOD OF EXTRACTING IMAGE

(75) Inventors: Nobuharu Nagaoka, Nasukarasuyama (JP); Fuminori Taniguchi, Tochigi-ken (JP); Masahito Watanabe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 634 days.

(21) Appl. No.: 11/287,552

(22) Filed: Nov. 23, 2005

(65) Prior Publication Data

US 2006/0115163 A1 Jun. 1, 2006

(30) Foreign Application Priority Data

Nov. 30, 2004 (JP) ............................. 2004-347463

(51) Int. Cl.
 *G06K 9/00* (2006.01)
 *G06K 9/62* (2006.01)
 *H04N 7/18* (2006.01)

(52) U.S. Cl. .................. 382/103; 382/209; 348/149

(58) Field of Classification Search ........... 382/103, 382/104, 107, 154, 190, 209; 348/143, 148, 348/149, 162, 164, 118, 120, 234, 235, 393.1, 348/489, 631, 663, 837; 701/200; 340/901–904
See application file for complete search history.

(56) References Cited

U.S. PATENT DOCUMENTS

| | | | |
|---|---|---|---|
| 6,014,608 A * | 1/2000 | Seo ............................. 701/207 |
| 6,265,991 B1 * | 7/2001 | Nishiwaki et al. ........... 340/903 |
| 6,327,536 B1 * | 12/2001 | Tsuji et al. .................. 701/301 |
| 6,373,518 B1 | 4/2002 | Sogawa |
| 6,385,334 B1 * | 5/2002 | Saneyoshi et al. ........... 382/154 |
| 6,385,536 B2 | 5/2002 | Kimura |
| 6,531,959 B1 | 3/2003 | Nagaoka et al. |
| 6,546,115 B1 | 4/2003 | Ito et al. |
| 6,594,600 B1 | 7/2003 | Arnoul et al. |
| 6,658,150 B2 * | 12/2003 | Tsuji et al. ................... 382/218 |
| 6,683,969 B1 * | 1/2004 | Nishigaki et al. ........... 382/104 |
| 6,690,011 B2 | 2/2004 | Watanabe et al. |
| 6,785,403 B1 * | 8/2004 | Murakami et al. .......... 382/104 |
| 6,956,503 B2 | 10/2005 | Yokokohji et al. |
| 7,130,448 B2 | 10/2006 | Nagaoka et al. |
| 7,141,796 B2 | 11/2006 | Hattori et al. |
| 7,233,233 B2 | 6/2007 | Taniguchi et al. |
| 2001/0002936 A1 | 6/2001 | Tsuji et al. |
| 2003/0007074 A1 | 1/2003 | Nagaoka et al. |
| 2003/0169917 A1 | 9/2003 | Ishiyama |

(Continued)

FOREIGN PATENT DOCUMENTS

DE 100 33 599 A1 2/2001

(Continued)

*Primary Examiner*—Abolfazl Tabatabai
(74) *Attorney, Agent, or Firm*—Carrier, Blackman & Associates, P.C.; William D. Blackman; Joseph P. Carrier

(57) ABSTRACT

The luminance signal of a reference image obtained by an infrared camera is adjusted such that the luminance signal of the reference image obtained is greater at all times than the luminance signal of a searching image obtained by an infrared camera. Correlative calculations are performed on the reference image and the searching image to detect one object in the reference image and the searching image without detecting the background of the images in error.

13 Claims, 16 Drawing Sheets

U.S. PATENT DOCUMENTS

| | | |
|---|---|---|
| 2003/0169918 A1 | 9/2003 | Sogawa |
| 2004/0066965 A1 | 4/2004 | Watanabe et al. |
| 2004/0183906 A1 | 9/2004 | Nagaoka et al. |
| 2005/0063565 A1 | 3/2005 | Nagaoka et al. |
| 2005/0276450 A1 | 12/2005 | Taniguchi et al. |

FOREIGN PATENT DOCUMENTS

| | | |
|---|---|---|
| DE | 102 28 638 A1 | 1/2003 |
| DE | 102 47 371 A1 | 7/2003 |
| DE | 103 01 469 A1 | 9/2003 |
| DE | 103 01 468 A1 | 10/2003 |
| DE | 10 2004 012 811 A1 | 11/2004 |
| DE | 10 2004 041 919 A1 | 4/2005 |
| DE | 10 2005 026 875 A1 | 1/2006 |
| DE | 10 2005 026 876 A1 | 6/2006 |
| EP | 1 089 054 A2 | 4/2001 |
| EP | 1 245 443 A2 | 10/2002 |
| FR | 97 13375 | 10/1997 |
| JP | 01-273113 | 11/1989 |
| JP | 06-253204 | 9/1994 |
| JP | 08-086613 | 4/1996 |
| JP | 08-210816 | 8/1996 |
| JP | 08-276787 | 10/1996 |
| JP | 08-293029 | 11/1996 |
| JP | 10-115518 | 5/1998 |
| JP | 11-083475 | 3/1999 |
| JP | 11-083530 | 3/1999 |
| JP | 11-259632 | 9/1999 |
| JP | 11-325889 | 11/1999 |
| JP | 2000-003448 | 1/2000 |
| JP | 2001-91984 | 4/2001 |
| JP | 2001-506369 | 5/2001 |
| JP | 2001-160144 | 6/2001 |
| JP | 2001-211449 | 8/2001 |
| JP | 2002-005626 | 8/2001 |
| JP | 2001-289654 | 10/2001 |
| JP | 2001-351193 | 12/2001 |
| JP | 2002-005656 | 1/2002 |
| JP | 2002-290234 | 1/2002 |
| JP | 2002-250770 | 9/2002 |
| JP | 2003-141520 | 5/2003 |
| JP | 2003-216937 | 7/2003 |
| JP | 3515926 | 1/2004 |
| JP | 2004-128887 | 4/2004 |
| JP | 2004-239791 | 8/2004 |

* cited by examiner a2>a1, a1>b2 a2>a1, b2>a1

APPARATUS FOR AND METHOD OF EXTRACTING IMAGE

BACKGROUND OF THE INVENTION

1. Field of the Invention

The present invention relates to an apparatus for and a method of extracting an image of one object by comparing obtained images of the object, the images by a plurality of imaging units.

2. Description of the Related Art

There has been developed a vehicle vicinity monitoring apparatus for obtaining images of one object with two imaging units mounted on a vehicle, for example, either measuring the distance up to the object based on the parallax between the obtained images, or measuring the position in an actual space of the object with respect to the vehicle, and informing the driver of whether there is an obstacle ahead of the vehicle or not (see Japanese Laid-Open Patent Publication No. 2003-216937).

For extracting the same object from the two images obtained by the two imaging units, correlative calculations are used to determine the sum of absolute differences (SAD) between image data of an object area identified in one of the images and image data of the other image, and to regard an area where the sum is minimum as an object area in the other image.

The imaging units, each comprising a CCD camera or the like, may not necessarily have identical video characteristics because they tend to have different optical characteristics and different photoelectric conversion characteristics of respective pixels and photoelectrically converted video signals tend to contain noise. If the above correlative calculations are performed on image signals from the two imaging units whose video characteristics are different from each other, then the background of the object in question may possibly be recognized in error, and different objects may possibly be judged as the same object.

SUMMARY OF THE INVENTION

It is a general object of the present invention to provide an apparatus for and a method of reliably extracting an image of one object from images obtained by a plurality of imaging units even if the imaging units have different characteristics.

A primary object of the present invention is to provide an apparatus for and a method of extracting an image of a desired object without recognizing a background image in error.

According to an aspect of the present invention, the luminance signal of a reference image obtained by a reference imaging unit is adjusted such that the luminance signal of the reference image is greater by a predetermined amount than the luminance signal of a searching image obtained by a searching imaging unit. Then, a reference image of a particular object area set in the reference image is compared with the searching image. An image corresponding to a particular object in the reference image can reliably be searched for from the searching image without detecting the background of the reference image or the searching image in error.

According to another aspect of the present invention, an image having a greatest luminance signal is selected from images obtained by a plurality of imaging units, and an image of a particular object area set in the selected image is compared with an image from another of the imaging units. An image of a particular object can reliably be extracted from the image of the other imaging unit.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a perspective view of a service aiming adjustment apparatus installed in a service factory or the like;

DESCRIPTION OF THE PREFFERED EMBODIMENTS

Apparatus for and methods of extracting an image according to preferred embodiments of the present invention will be described below with reference to the accompanying drawings.

Figure 1:
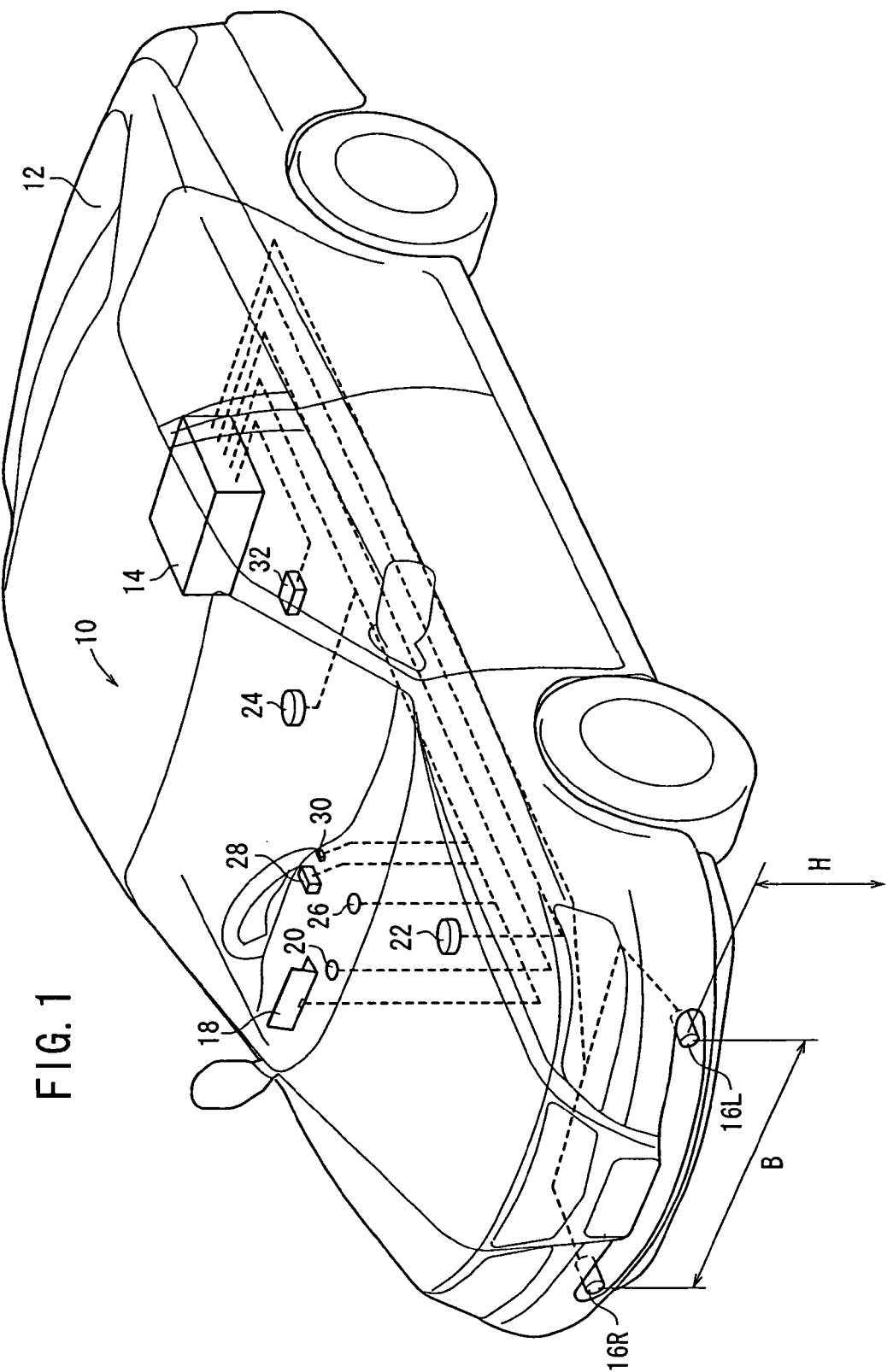
FIG. 1 is a schematic perspective view of a night vision system installed on a vehicle which incorporates an image extracting apparatus according to an embodiment of the present invention.

As shown in FIG. 1, a night vision system (vehicle vicinity monitoring apparatus) 10 according to an embodiment of the present invention is installed on a vehicle 12. The night vision system 10 has an ECU (Electronic Control Unit) 14 serving as a main controller, a pair of left and right infrared cameras (imaging units) 16R, 16L, an HUD (Head-Up Display) 18 for displaying a detected image, a speaker 20 for outputting an alarm sound, a speed sensor 22 for detecting a running speed, a yaw rate sensor 24 for detecting a yaw rate of the vehicle 12 when the vehicle 12 is driven, a solar radiation sensor 26, a headlight switch 28, a main switch 30 for selectively activating and inactivating the night vision system 10, and a connector 32 for connecting the night vision system 10 to an external computer system. These components of the night vision system 10 may be connected to each other by intravehicular communication lines that are used by other systems on the vehicle 12.

The infrared cameras 16R, 16L are mounted respectively in the right and left ends of a horizontal grill hole defined in a lower bumper region. The infrared cameras 16R, 16L are oriented forwardly at respective symmetrical positions and horizontally spaced from each other by an inter-camera distance (also referred to as "base length") B. Each of the infrared cameras 16R, 16L detects far-infrared radiation to obtain an infrared image in which higher-temperature areas represent higher luminance, and supplies the obtained image to the ECU 14.

The HUD 18 is disposed on an upper surface of an instrumental panel at a position directly in front of the driver seated on a driver's seat of the vehicle 12, while trying not to obstruct the front vision of the driver. When the night vision system 10 is turned off, the HUD 18 is retracted down in the instrumental panel. If it is judged that the present time is nighttime based on information from the solar radiation sensor 26 and also that the headlights (or fog lamps) are turned on based on information from the headlight switch 28, then the HUD 18 pops up from the instrumental panel when the main switch 30 is turned on. The HUD 18 has an image display panel comprising a concave mirror for reflecting and projecting an image sent from within the instrumental panel. The night vision system 10 may be automatically activated by an automatic lighting function regardless of whether the main switch 30 is operated or not. The luminance of the image display panel of the HUD 18 may be made adjustable by a suitable switch.

The ECU 14 processes two infrared images obtained by the respective infrared cameras 16R, 16L to detect heat-source objects based on the parallax between the infrared images, and displays the detected heat-source objects as white silhouettes on the HUD 18. When the ECU 14 identifies a pedestrian among the heat-source objects, the ECU 14 controls the speaker 20 to output an alarm sound and also controls the HUD 18 to highlight the identified pedestrian with a surrounding frame having a striking color for thereby drawing the driver's attention. The ECU 14 performs such an attention drawing function at such good timing to allow the driver to take a sufficient danger avoiding action, by predicting a period of time until the vehicle 12 reaches the position of the pedestrian in a predetermined speed range.

In order for the infrared cameras 16R, 16L to be able to accurately determine the positions, distances, and shapes of far heat-source objects, the infrared cameras 16R, 16L are subject to an adjustment process called an aiming process (which will be described later) when they are manufactured in the manufacturing plant or when they are inspected at regular intervals.

Figure 2:
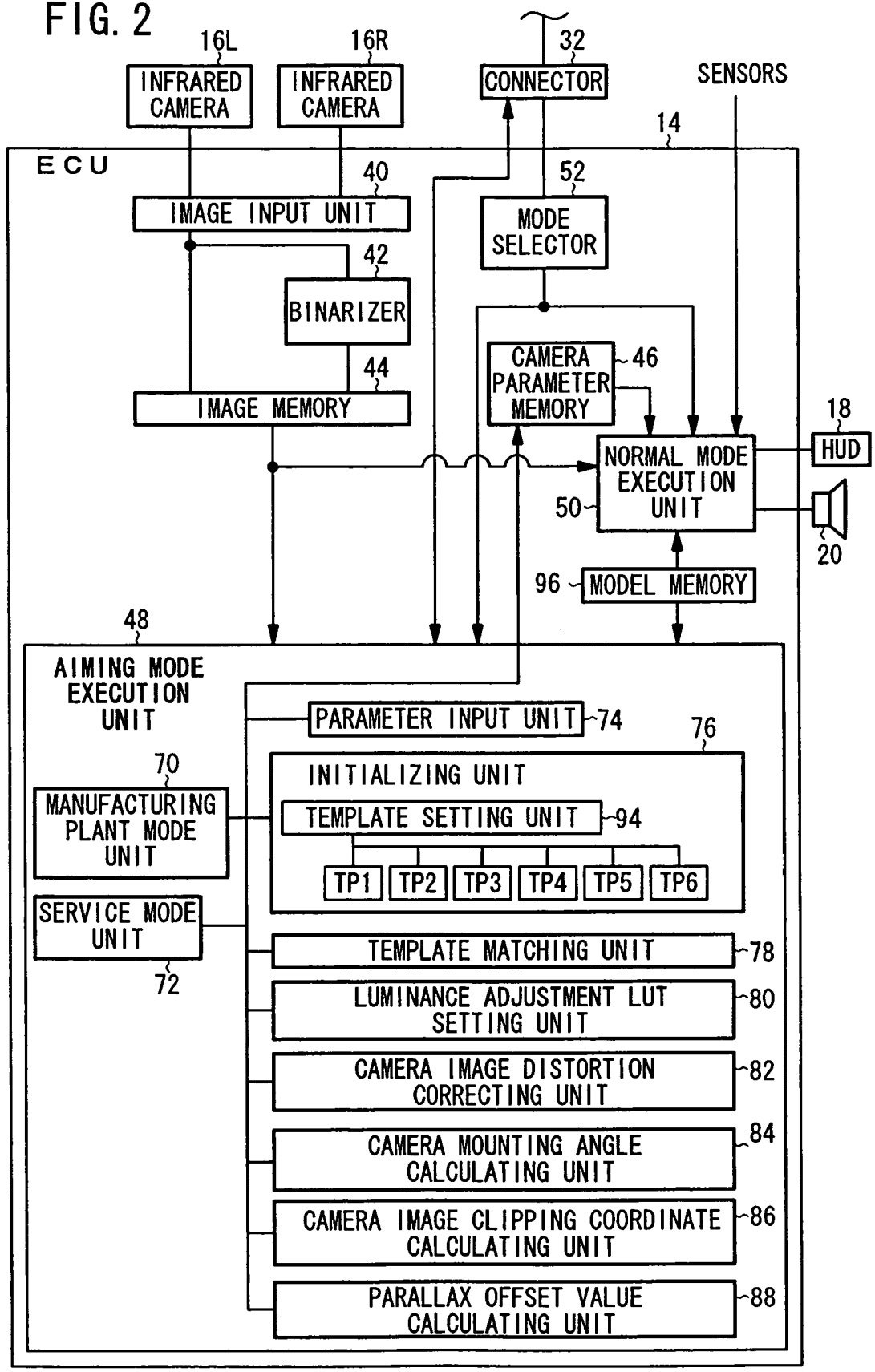
FIG. 2 is a functional block diagram of an ECU of the night vision system shown in FIG. 1.

As shown in FIG. 2, the ECU 14 comprises an image input unit 40 for converting analog infrared images obtained by the respective infrared cameras 16R, 16L into digital gray-scale images, a binarizer 42 for generating binary images from the gray-scale images based on a threshold value, an image memory 44 for storing the binary images and the gray-scale images, an aiming mode execution unit 48 for storing camera parameters produced as a result of the aiming process into a camera parameter memory 46, a normal mode execution unit 50 for performing a normal image processing process while referring to sensors including the speed sensor 22, etc. and the camera parameter memory 46, and controlling the HUD 18 and the speaker 20, and a mode selector 52 for selecting either an aiming mode or a normal mode at a time based on an instruction transmitted from an external computer system through the connector 32.

The aiming mode execution unit 48 has a manufacturing plant mode unit 70 for performing the aiming process with an aiming target control apparatus 100 (see FIG. 4) as the external computer system in the manufacturing plant in which the vehicle 12 is manufactured, and a service mode unit 72 for performing the aiming process with a service aiming adjustment apparatus 120 (see FIG. 5) as the external computer system in a service factory or the like. Either the manufacturing plant mode unit 70 or the service mode unit 72 is selected at a time based on an instruction from a corresponding one of the external computer systems.

The aiming mode execution unit 48 has a parameter input unit 74 for inputting certain parameters from the external computer system when the aiming process is initiated, an initializing unit 76 for making initial settings required by the aiming process, a template matching unit 78 for performing template matching on the gray-scale images stored in the image memory 44, a luminance adjustment LUT setting unit 80 for setting a luminance adjustment LUT for adjusting the luminance of image signals produced by the infrared cameras 16R, 16L, a camera image distortion correcting unit 82 for correcting image distortions caused due to individual differences as to focal lengths, pixel pitches, etc. between the infrared cameras 16R, 16L, a camera mounting angle calculating unit 84 for calculating respective mounting angles (a pan angle and a pitch angle) of the infrared cameras 16R, 16L, a camera image clipping coordinate calculating unit 86 for calculating clipping coordinates used as a reference for clipping processed ranges from images, and a parallax offset value calculating unit 88 for calculating a parallax offset value as an error which is contained in the parallax between object images because the optical axes of the infrared cameras 16R, 16L are not parallel to each other.

The initializing unit 76 has a template setting unit 94 for selecting one of six templates TP1, TP2, TP3, TP4, TP5, TP6 (collectively also referred to as "template TP") that have been prepared depending on the distance up to objects. The ECU 14 has a model memory 96 for storing, as a formula, a perspective transformation model for determining the position of an object. The aiming mode execution unit 48 and the normal mode execution unit 50 calculate the position of an imaged object using the perspective transformation model stored in the model memory 96. The model memory 96 stores a short-distance model for objects at short distances and a long-distance model for objects at long distances.

Figure 3:
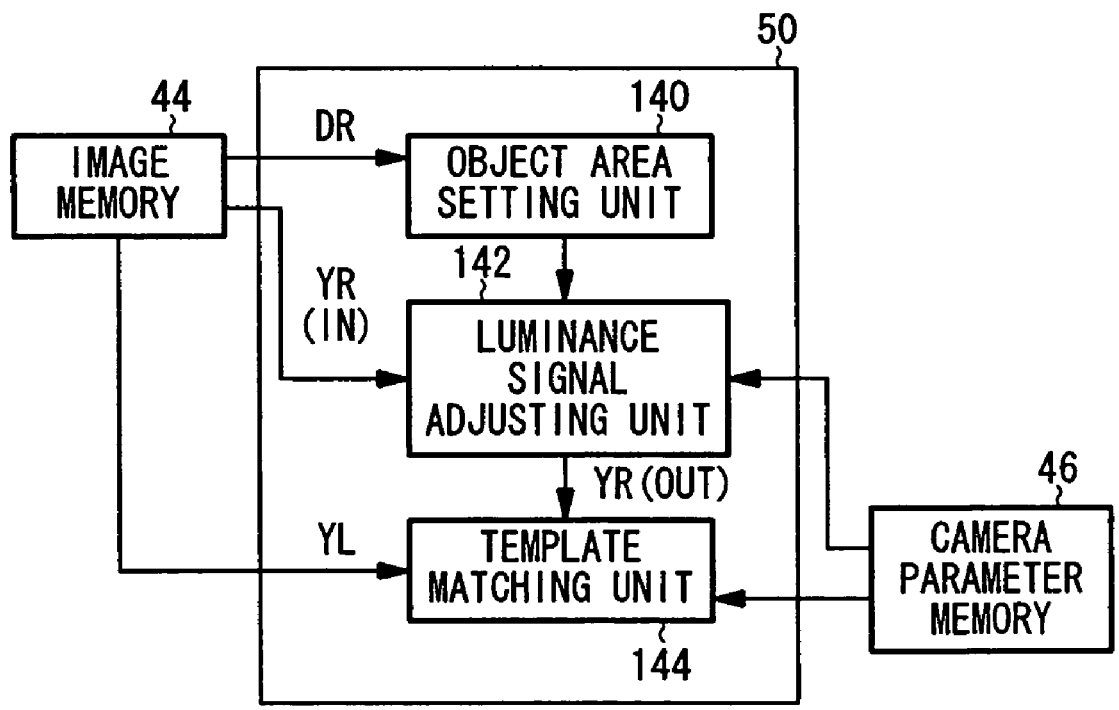
FIG. 3 is a block diagram of a normal mode execution unit in the ECU shown in FIG. 2.

FIG. 3 shows in block form an image extracting function of the normal mode execution unit 50. As shown in FIG. 3, the normal mode execution unit 50 has an object area setting unit 140 for clipping and setting an object area from a binary image DR obtained by the infrared camera 16R (reference imaging unit) and stored in the image memory 44, a luminance signal adjusting unit 142 for adjusting the luminance signal of an image (gray-scale image YR (IN)) obtained by the infrared camera 16R using the luminance adjustment LUT stored in the camera parameter memory 46, such that the luminance signal of the image (gray-scale image YR (IN)) obtained by the infrared camera 16R is greater by a predetermined amount than the luminance signal of an image (gray-scale image YL) obtained by the infrared camera 16L (searching imaging unit), and a template matching unit 144 (an image comparing unit, an image extracting unit) for extracting an image from the image (gray-scale image YL) obtained by the infrared camera 16L according to correlative calculations, using an object area in the image (gray-scale image YR (OUT)) obtained by the infrared camera 16R and adjusted in luminance as a template.

The ECU 14 has a CPU (Central Processing Unit) as a main controller, a RAM (Random Access Memory) and a ROM (Read Only Memory) as a memory device, and other components. The above functions of the ECU 14 are implemented in software when the CPU reads a program and executes the program in cooperation with the memory device.

Figure 4:
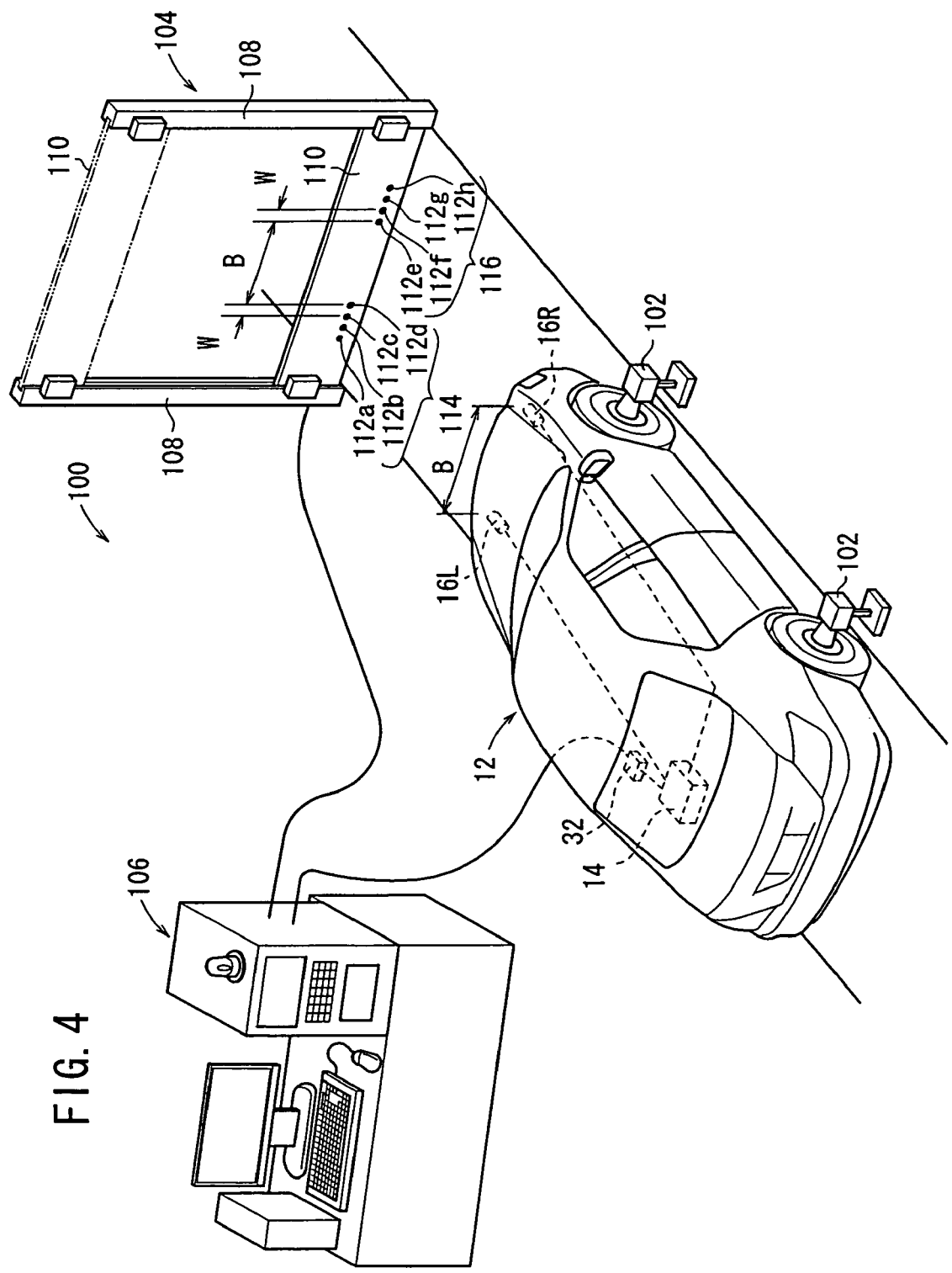
FIG. 4 is a perspective view of an aiming target control apparatus installed in a manufacturing plant.

As shown in FIG. 4, the aiming target control apparatus 100 has positioning devices 102 for positioning the vehicle 12, a gate 104 disposed in a given position in front of the infrared cameras 16R, 16L on the vehicle 12 that is positioned by the positioning devices 102, and a main control device 106 for communicating with the ECU 14 through the connector 32 and controlling the gate 104. The gate 104 has two vertical posts 108 horizontally spaced from each other by a distance which is slightly greater than the width of the vehicle 12, and a horizontally elongate aiming target plate 110 having left and right ends movably supported respectively by the posts 108. The aiming target plate 110 is vertically movable along the posts 108 by the main control device 106. The aiming target plate 110 supports thereon an array of eight aiming targets 112a through 112h (collectively also referred to as "aiming target 112") as heat sources that are successively arranged horizontally from the left in the order named.

The four left aiming targets 112a through 112d are spaced at relatively small intervals W and belong to a left target group 114. The four right aiming targets 112e through 112h are also spaced at the intervals W and belong to a right target group 116. The aiming target 112d on the right end of the left target group 114 and the aiming target 112e on the left end of the right target group 116 are spaced from each other by a distance which is equal to the base length B (W<B). These aiming targets 112d, 112e are positioned just in front of the infrared cameras 16L, 16R, respectively.

Figure 5:
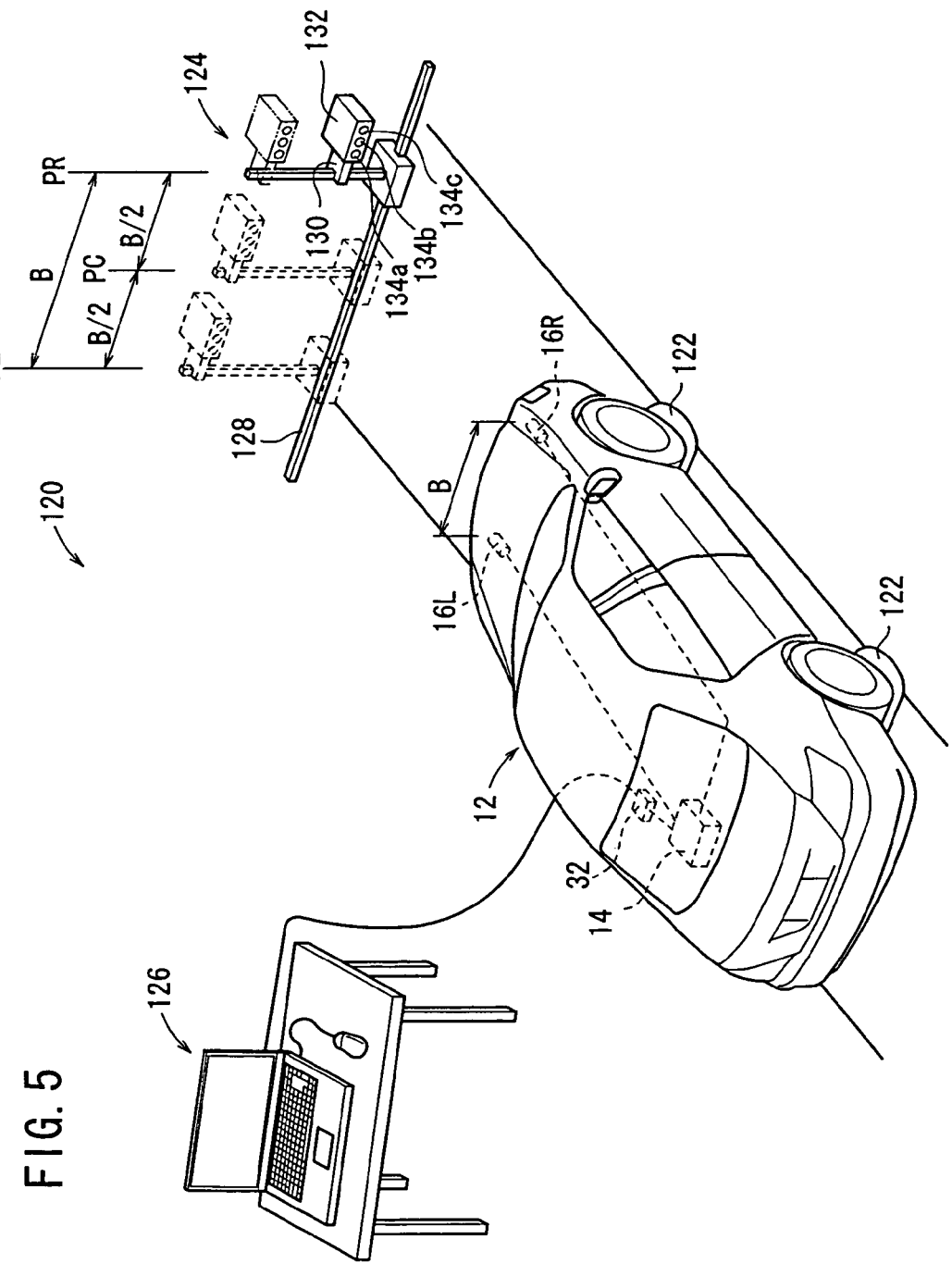

As shown in FIG. 5, the service aiming adjustment apparatus 120 has positioning markers 122 for positioning the vehicle 12, a headlight tester 124 disposed in a given position in front of the infrared cameras 16R, 16L on the vehicle 12 that is positioned based on the positioning markers 122, and a main control device 126 for communicating with the ECU 14 through the connector 32. The headlight tester 124 is movable along a rail 128 in directions parallel to the transverse direction of the vehicle 12 and has a lifter table 130 which is vertically movable. The lifter table 130 supports thereon a target plate 132 having three aiming targets 134a through 134c (collectively also referred to as "aiming target 134") as heat sources that are successively arranged horizontally. The aiming targets 134a through 134c are spaced at the intervals W (W<B). The aiming target 134 may be identical to or substantially the same as the aiming target 112 of the gate 104 shown in FIG. 4.

The aiming process to be performed on the night vision system 10 using the aiming target control apparatus 100 or the service aiming adjustment apparatus 120 will be described below.

The aiming process includes a manufacturing plant aiming mode to be performed using the aiming target control apparatus 100 and a service aiming mode to be performed using the service aiming adjustment apparatus 120.

In the manufacturing plant aiming mode, the vehicle 12 is positioned by the positioning devices 102, and the main control device 106 is connected to the connector 32 of the vehicle 12. The main control device 106 sends an instruction for performing the manufacturing plant aiming mode using the aiming target control apparatus 100 to the ECU 14. The aiming targets 112a through 112h are positionally adjusted to the same height as the infrared cameras 16R, 16L depending on the type of the vehicle 12.

In the service aiming mode, the vehicle 12 is positioned with the wheels aligned with the respective positioning markers 122, and the main control device 126 is connected to the connector 32 of the vehicle 12. The main control device 126 sends an instruction for performing the service aiming mode using the service aiming adjustment apparatus 120 to the ECU 14. The aiming targets 134a through 134c are positionally adjusted to a predetermined height.

FIGS. 6 through 10 show the aiming process that is mainly performed by the aiming mode execution unit 48 of the ECU 14. The aiming process will be described in detail below with reference to FIGS. 6 through 10.

Figure 6:
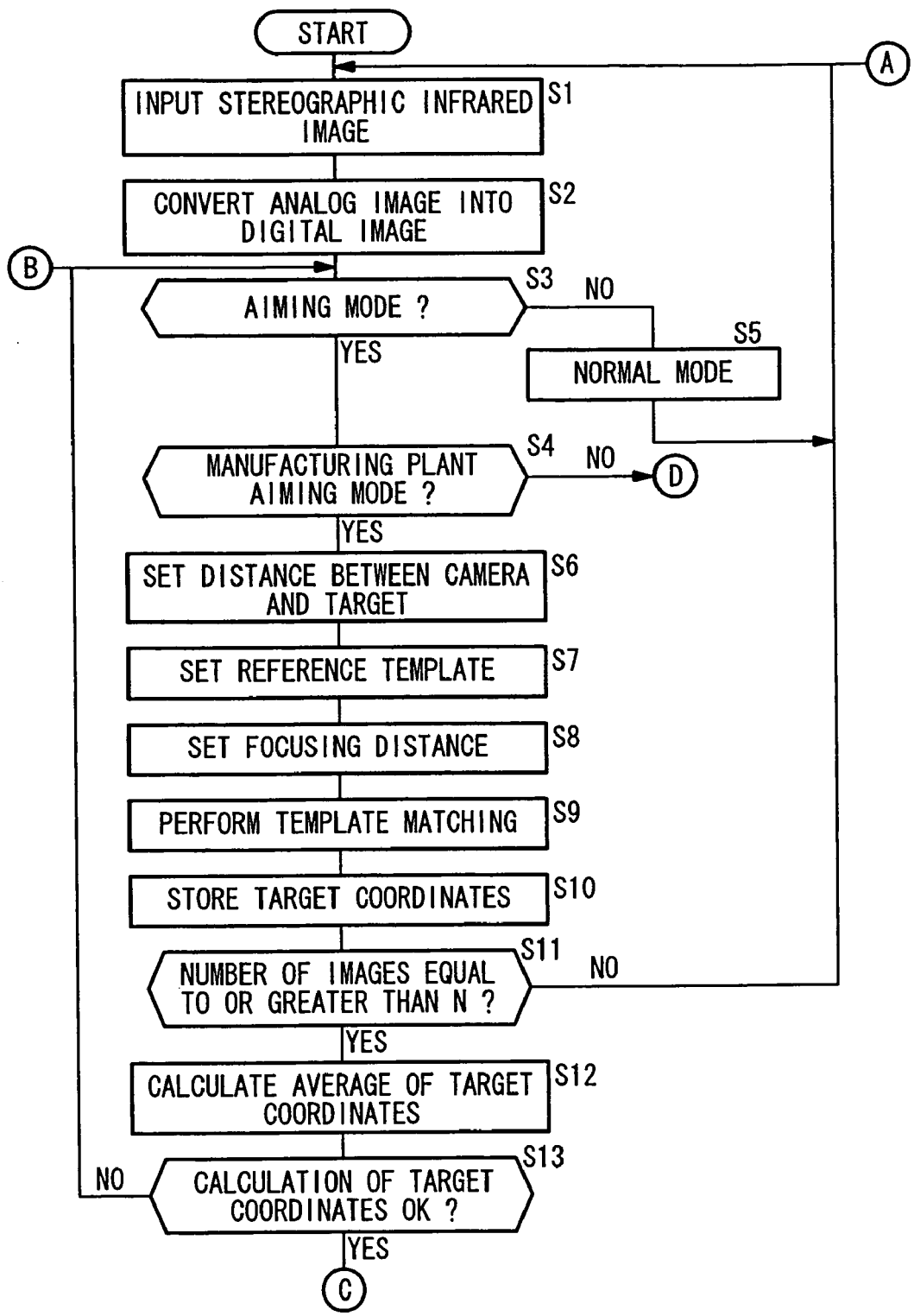
FIGS. 6 through 10 are flowcharts of an aiming process.

In step S1 shown in FIG. 6, an analog stereographic infrared image is input from the infrared cameras 16R, 16L to the image input unit 40. The image input unit 40 converts the analog stereographic infrared image into a digital gray-scale image in step S2. The gray-scale image is stored in the image memory 44. The gray-scale image is converted by the binarizer 42 into a binary image, which is also stored in the image memory 44.

In step S3, the mode selector 52 determines whether the aiming mode or the normal mode is to be executed according to an instruction from the main control device 106 or 126. If the normal mode is to be executed, then control goes to step S5. If the aiming mode is to be executed, then control goes to step S4.

In the normal mode in step S5, the normal mode execution unit 50 operates to refer to the camera parameters stored in the camera parameter memory 46, and controls the HUD 18 and the speaker 20 to search for an object and draw the driver's attention, as described later. Thereafter, control goes back to step S1.

In the aiming mode in step S4, the mode selector 52 determines which of the aiming target control apparatus 100 and the service aiming adjustment apparatus 120 is to be used. If it is judged that the aiming target control apparatus 100 is to be used, then control goes to step S6 in order for the manufacturing plant mode unit 70 to perform the manufacturing plant aiming mode. If it is judged that the service aiming adjustment apparatus 120 is to be used, then control goes to step S30 (see FIG. 8) in order for the service mode unit 72 to perform the service aiming mode. The manufacturing plant aiming mode and the service aiming mode will successively be described below.

In the manufacturing plant aiming mode, a distance from the infrared cameras 16R, 16L to the aiming target plate 110 is set in step S6.

In step S7, the template setting unit 94 selects a reference template corresponding to the aiming target 112 from the templates TP1 through TP6.

In step S8, in order to calculate the position of the aiming target 112 using a perspective transformation model corresponding to the distance up to the aiming target 112 disposed at a short distance, a focusing distance (focal length) of the infrared cameras 16R, 16L which matches the perspective transformation model is set.

In step S9, a template matching process is performed based on the template TP selected in step S7. Specifically, correlative calculations are performed on a gray-scale image of the aiming target 112 obtained by the infrared cameras 16R, 16L and the template TP, and coordinates of a gray-scale image or a target for which the results of the correlative calculations are minimum are calculated and stored in step S10.

In step S11, it is confirmed whether the number of acquired gray-scale images has reached a predetermined number N or not. If the number of acquired gray-scale images has reached the predetermined number N, then control goes to step S12. If the number of acquired gray-scale images is smaller than the predetermined number N, then control goes back to step S1 to acquire another gray-scale image and calculate and store target coordinates.

In step S12, the N sets of target coordinates are averaged. If it is judged that target coordinates are properly calculated in step S13, then control goes to step S14 (see FIG. 7). If it is judged that target coordinates are not properly calculated in step S13, then control goes back to step S3.

In step S14, a luminance adjustment LUT is set. Specifically, in order to reliably perform the template matching process based on correlative calculations, the levels of luminance signals of the aiming target 112 which are detected by the infrared cameras 16R, 16L are compared with each other, for example, and a luminance adjustment LUT is set such that the luminance signal from the infrared camera 16R, which is used as a reference for the correlative calculations, will be greater at all times than the luminance signal from the infrared camera 16L at each of the luminance levels. If it is judged that the process of setting a luminance adjustment LUT is properly performed in step S15, then control goes to step S16.

In step S16, an image distortion corrective value for correcting image distortions caused due to individual differences as to focal lengths, pixel pitches, etc. between the infrared cameras 16R, 16L is calculated. If it is judged that an image distortion corrective value is properly calculated in step S17, then control goes to step S18.

In step S18, a pan angle and a pitch angle, which serve as mounting angles of the left and right cameras, i.e., the infrared cameras 16R, 16L, are calculated. If it is judged that mounting angles of the left and right cameras are properly calculated in step S19, then control goes to step S20.

In step S20, clipping coordinates for clipping image areas to be processed from the images obtained by the infrared cameras 16R, 16L are calculated. If it is judged that clipping coordinates are properly calculated in step S21, then control goes to step S22.

In step S22, a parallax offset value, which represents an error contained in the parallax between object images because the optical axes of the infrared cameras 16R, 16L are not parallel to each other, is calculated. If it is judged that a parallax offset value is properly calculated in step S23, then control goes to step S24.

In step S24, the luminance adjustment LUT, the image distortion corrective value, the pan angle and the pitch angle, the clipping coordinates, and the parallax offset value which are determined respectively in steps S14, S16, S18, S20, and S22 are stored in the camera parameter memory 46. If these parameters are properly stored, then the manufacturing plant aiming mode is finished. At this time, the ECU 14 sends a signal indicating that the manufacturing plant aiming mode is finished to the main control device 106. If the normal mode is to be subsequently executed, then a predetermined restarting process may be performed. If the answers to the branching processes in steps S17, S19, S21, S23, and S25 are negative, then control goes back to step S3 as when the answer to the branching process in step S13 is negative.

The service aiming mode will be described below. In the service aiming mode, steps S1 through S3 (see FIG. 6) are executed in the same manner as with the manufacturing plant aiming mode. Control then branches from step S4 to step S30 for the service mode unit 72 to perform a processing sequence shown in FIGS. 8 through 10.

Figure 8:
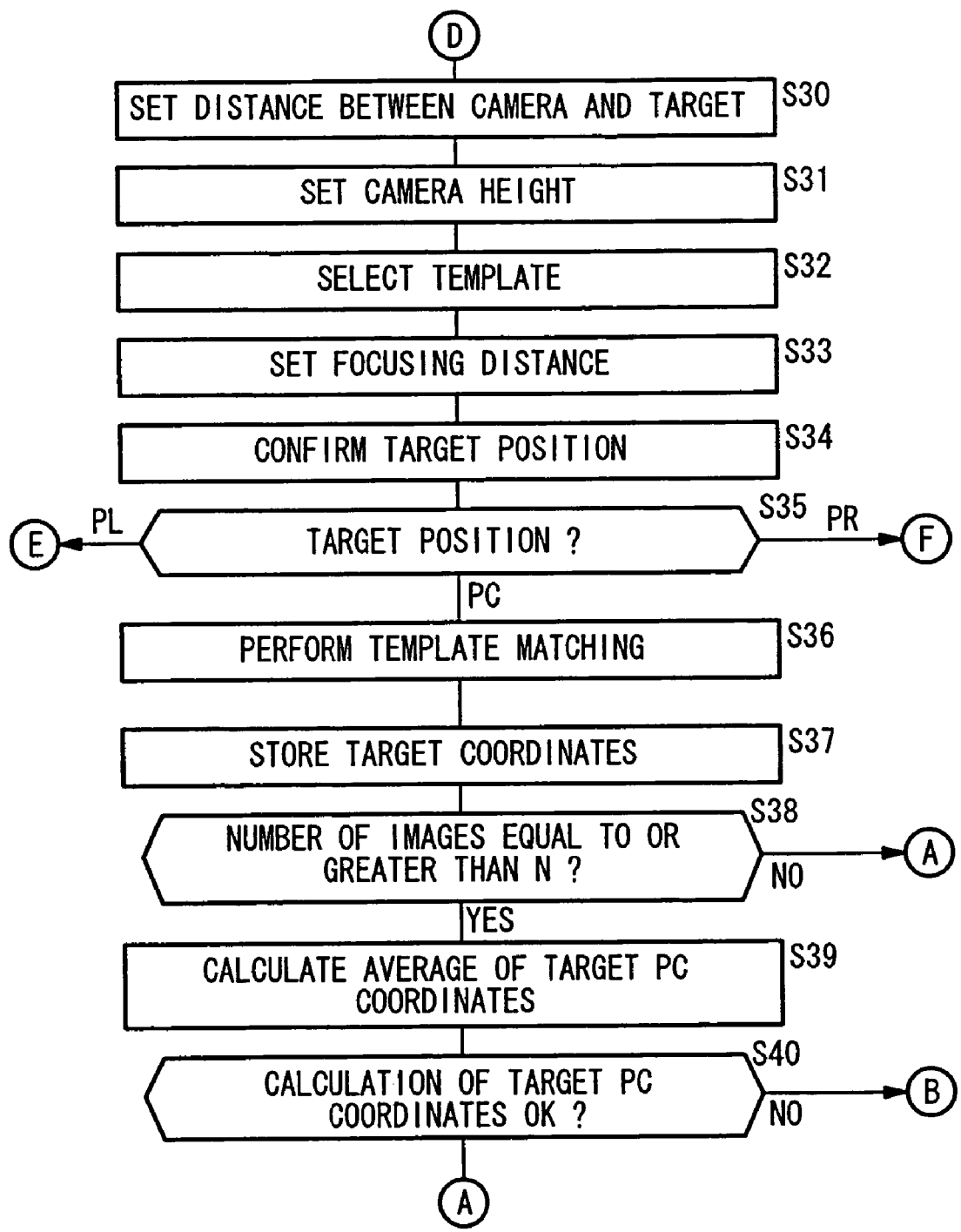

In step S30 shown in FIG. 8, a distance from the infrared cameras 16R, 16L to the target plate 132 is set. The distance from the infrared cameras 16R, 16L to the target plate 132 is determined by the position of the aiming target 134 installed in a service factory where the service aiming mode is performed. The distance is input from the main control device 126 to the ECU 14.

In step S31, the height H (see FIG. 1) of the infrared cameras 16R, 16L is confirmed and input.

In step S32, the template setting unit 94 selects one of the templates TP1 through TP6 which corresponds to the distance to the aiming target 134 set in step S30.

In step S33, a focusing distance matching the perspective transformation model which corresponds to the distance to the aiming target 134 is set in the same manner as with step S8.

In step S34, the position of the target plate 132 is confirmed. Specifically, in the service aiming mode, the target plate 132 is placed successively in a central position PC, a left position PL, and a right position PR (see FIG. 5). When step S34 is executed for the first time, a signal for positional confirmation is sent to the main control device 126 to place the target plate 132 in the central position PC. In response to the signal, the main control device 126 displays a message "PLACE TARGET IN CENTRAL POSITION PC AND PRESS "Y" KEY" on the monitor screen, for example. According to the message, the operator moves the headlight tester 124 along the rail 128 either manually or with a given actuator until the target plate 132 is placed in the central position PC.

In step S35, control is branched depending on the position of the target plate 132 at the time. If the target plate 132 is placed in the central position PC (in first through 30 cycles), then control goes to step S36. If the target plate 132 is placed in the left position PL (in 31st through 60th cycles), then control goes to step S41 (see FIG. 9). If the target plate 132 is placed in the right position PR (in 61st and subsequent cycles), then control goes to step S46 (see FIG. 10).

In step S36, a template matching process is performed in the same manner as with step S9.

In step S37, target coordinates of the aiming target 134 are calculated and stored in the same manner as with step S10.

In step S38, the number of acquired gray-scale images is confirmed in the same manner as with step S11. If the number of acquired gray-scale images is 30 or more, then control goes to step S39. If the number of acquired gray-scale images is smaller than 30, then control goes back to step S1. In the second and subsequent cycles, steps S3 through S8 and steps S30 through S35 are skipped.

In step S39, the target coordinates at the central position PC are averaged in the same manner as with step S12. If it is judged that target coordinates are normally calculated in step S40, then control goes back to step S1. If target coordinates are not normally calculated in step S40, then control goes back to step S3.

Figure 9:
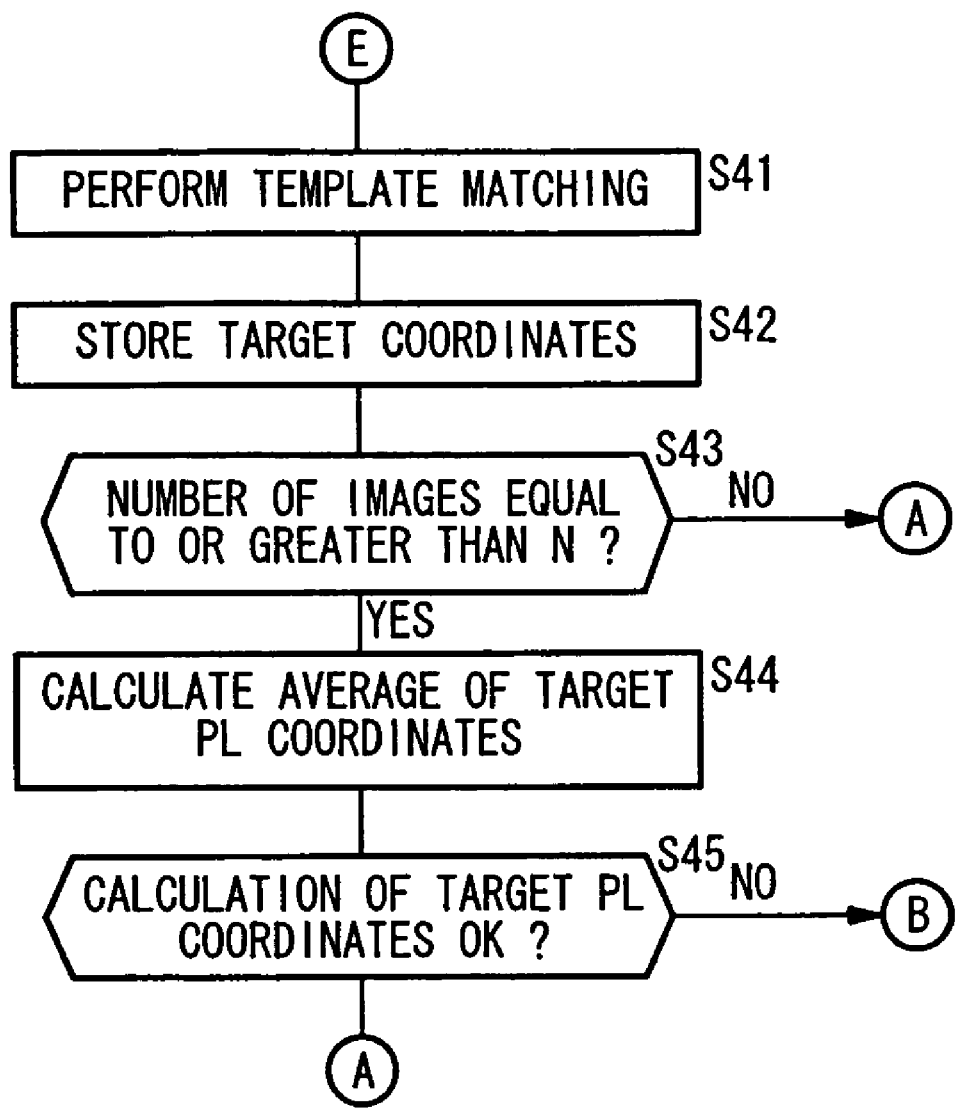

The target plate 132 is placed in the left position PL, and steps S41 through S45 shown in FIG. 9 are similarly executed.

Figure 10:
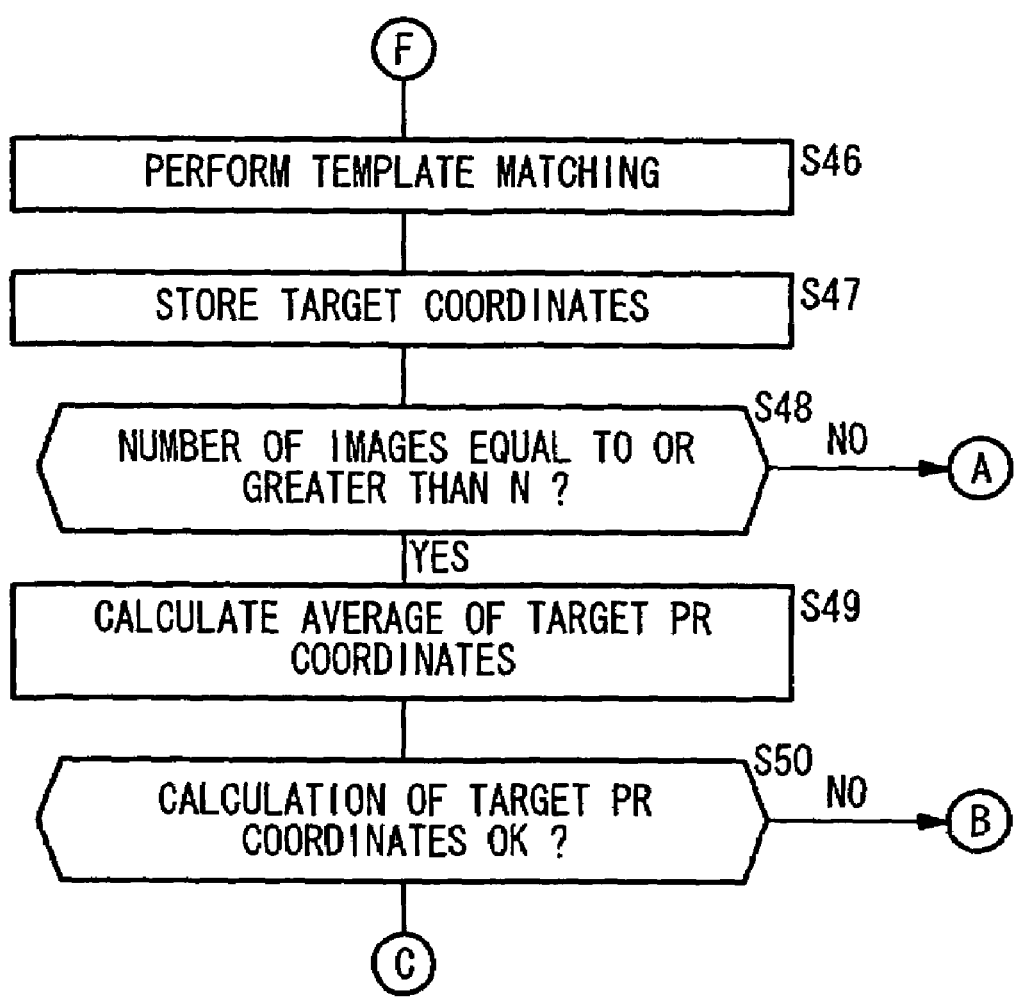

Then, the target plate 132 is placed in the right position PR, and steps S46 through S50 shown in FIG. 10 are similarly executed.

Figure 7:
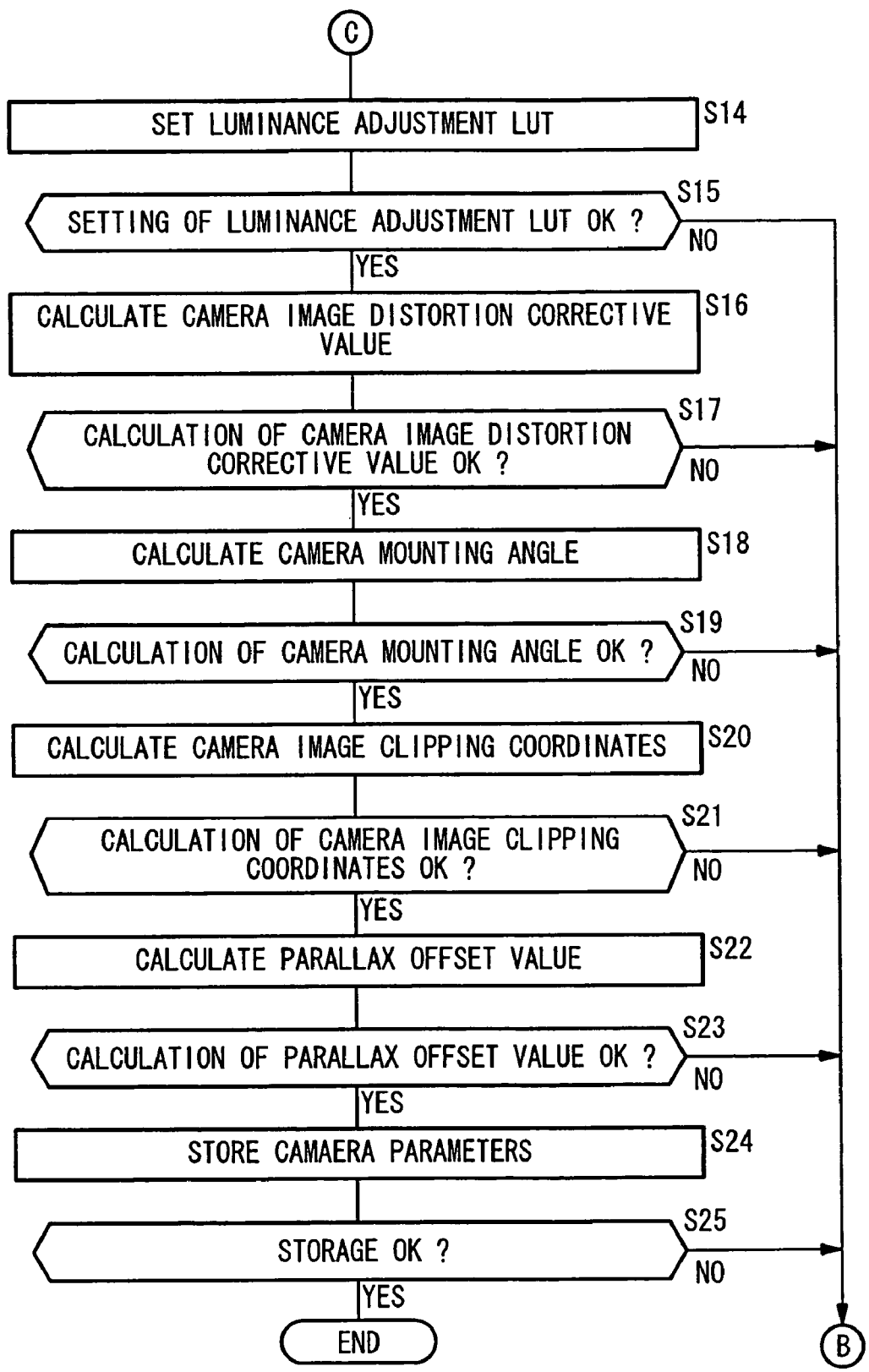

If it is judged that target coordinates are normally calculated in final step S50, then control goes back to step S14 (see FIG. 7). Subsequently, the same process as the manufacturing plant aiming mode is performed, and camera parameters are stored in the camera parameter memory 46.

After the camera parameters are set in the aiming mode, the normal mode is carried out using the camera parameters.

Figure 11:
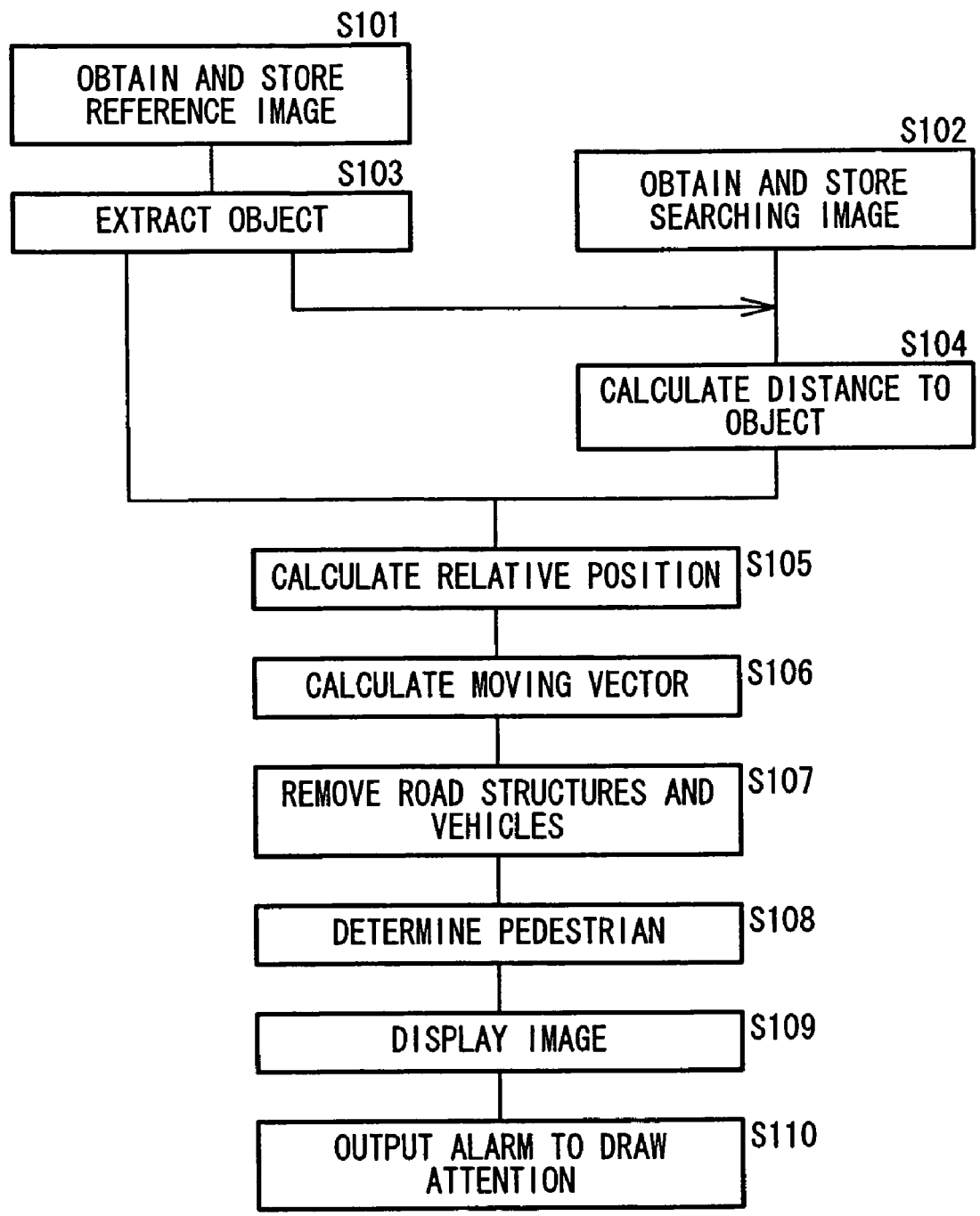
FIG. 11 is a flowchart of an object searching process in a normal mode.

An object searching process and, if necessary, an attention drawing process, in the normal mode will be described below with reference to a flowchart shown in FIG. 11.

An image of an area in front of the vehicle 12 is obtained as a reference image by the infrared camera 16R, and an image of an area in front of the vehicle 12 is obtained as a searching image by the infrared camera 16L. The obtained images are converted into respective gray-scale images YR (IN), YL, which are stored in the image memory 44, and the gray-scale image YR (IN) is converted by the binarizer 42 into a binary image DR, which is also stored in the image memory 44, in steps S101, S102.

The object area setting unit 140 (FIG. 3) of the normal mode execution unit 50 sets an object area 150 (see FIG. 12) including an object 148, e.g., a quadrangular area where values "1" of a binary image DR are successively arranged in an x direction (horizontal direction) and a y direction (vertical direction), using the binary image DR of a reference image 146 obtained by the infrared camera 16R in step S103. Then, the object area setting unit 140 searches for an object 154 in a searching image 152, which corresponds to the object 148 in the reference image 146, according to correlative calculations on the gray-scale images, calculates a parallax on the images between the objects 148, 154 that have been searched for, and determines a distance from the vehicle 12 to the object in step S104.

Prior to the correlative calculations, the luminance signal adjusting unit 142 adjusts the luminance signal of the reference image 146 or the searching image 152 using the luminance adjustment LUT representative of camera parameters, such that the luminance signal of the reference image 146 (gray-scale image YR (IN)) of the object area 150 obtained by the infrared camera 16R is greater than the luminance signal of the image of the object area 156 of the searching image 152 (gray-scale image YL) obtained by the infrared camera 16L. Then, the template matching unit 144 performs correlative calculations on the adjusted reference image 146 (gray-scale image YR (OUT)) and the searching image 152 (gray-scale image YL) to search for the object 154 from the searching image 152.

The coordinates of the objects 148, 154 in the reference image 146 and the searching image 152 are corrected by an image distortion coefficient which represents a camera parameter, and the parallax between the objects 148, 154 that have been searched for is corrected highly accurately by a parallax offset value which represents a camera parameter due to a relative pan angle. The distance from the vehicle 12 to the actual object is calculated highly accurately.

Then, the two-dimensional coordinates of the object 148 in the reference image 146 are corrected by an absolute pan angle and an absolute pitch angle of the infrared cameras 16R, 16L obtained in step S18, and a relative position represented by three-dimensional coordinates of the object 148 in the actual space, including the distance calculated in step S104, is calculated in step S105.

The three-dimensional coordinates of the object 148 in the actual space in step S105 are repeatedly calculated at small time intervals to calculate a moving vector of the object 148 in step S106. Using the moving vector, road structures and vehicles are removed from the object 148 in step S107. Then, it is determined whether there is a pedestrian or not from the shape of the remaining object 148 in step S108.

If it is judged that there is a pedestrian in step S108, then the reference image obtained by the infrared camera 16R is displayed on the HUD 18, and the image of the pedestrian is enclosed by a highlighting frame in step S109. The speaker 20 is energized to draw the driver's attention in step S110.

The reasons for setting a luminance adjustment LUT such that the luminance signal of the reference image 146 is greater than the luminance signal of the searching image 152 will be described below.

Figure 12:
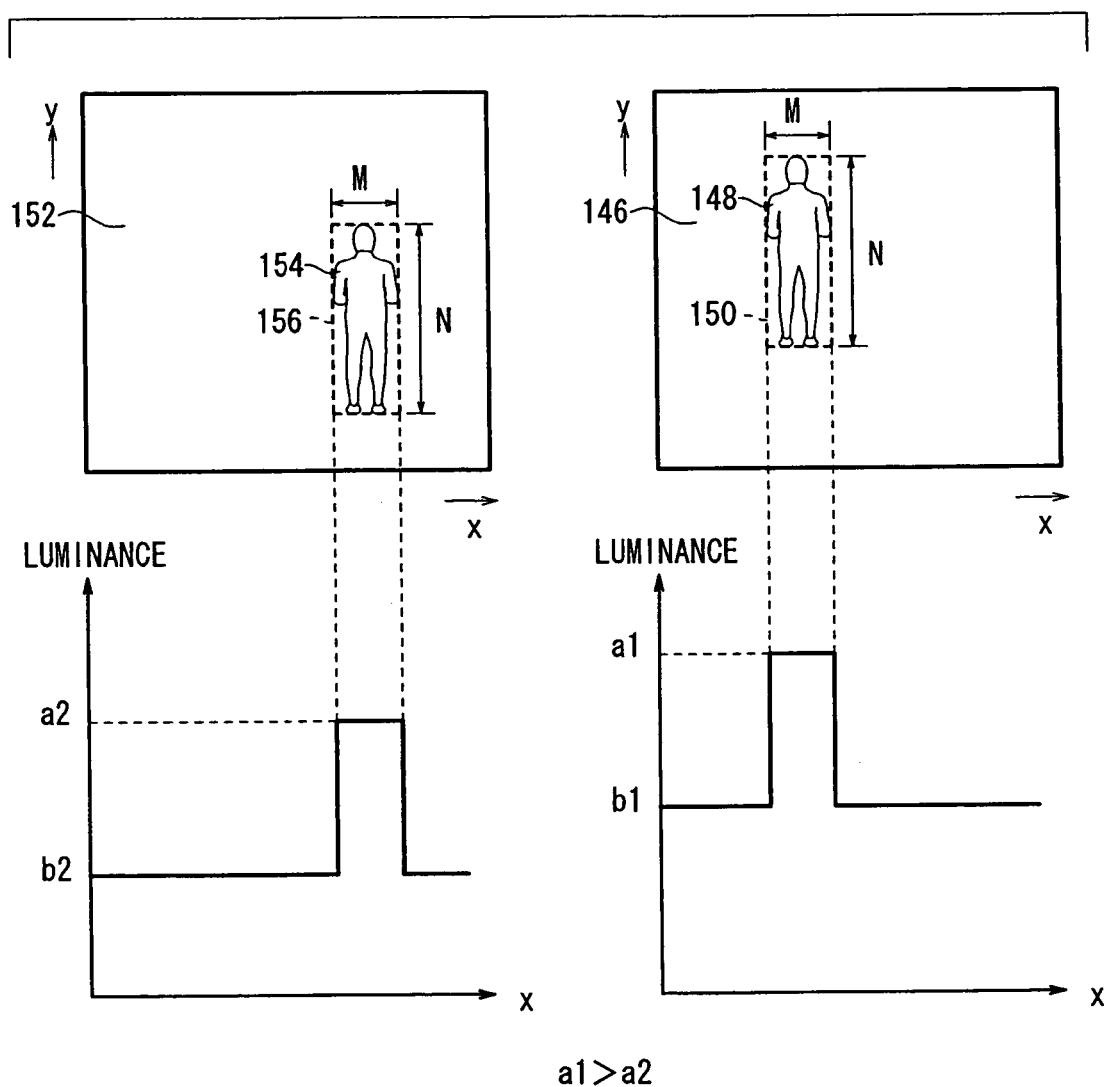
FIG. 12 is a diagram illustrative of an object extracting process in the normal mode and a luminance adjusting LUT (Look-Up Table) that is set for extracting an object.

In FIG. 12, the luminance signal at coordinates (x, y) of the reference image 146 is indicated by YR (x, y), the luminance signal at coordinates (x, y) of the searching image 152 by YL (x, y), the numbers of pixels in the x and y directions of the object area 150 by M, N, respectively, and the distances by which the object area 156 is displaced from the object area 150 in the x and y directions by p, q, respectively. The template matching unit 144 calculates a correlative function SAD (p, q) as follows:

$$SAD(p, q) = \sum_{i=0}^{M-1} \sum_{j=0}^{N-1} |YR(x+i, y+j) - YL(x+i+p, y+j+q)| \quad (1)$$

The object area 156 whose correlative function SAD (p, q) is minimum is extracted from the searching image 152.

Even if the correlative function SAD (p, q) is minimum, background images around the objects 148, 154 may possibly be detected as objects in error due to different sensitivity characteristics and noise of the infrared cameras 16R, 16L.

The luminance signal of the object 148 obtained by the infrared camera 16R is indicated by a1, the luminance signal of the background around the object 148 by b1, the luminance signal of the object 154 obtained by the infrared camera 16L by a2, and the luminance signal of the background around the object 154 by b2. An evaluating value MAD1 for the correlative function SAD (p, q) if the objects 148, 154 match each other, and an evaluating value MAD2 for the correlative function SAD (p, q) if the objects 148, 154 do not match each other are introduced as follows:

$$MAD1 = |a1-a2| + |b1-b2| \quad (2)$$

$$MAD2 = |a1-b2| + |b1|b2| \quad (3)$$

By establishing a condition to satisfy the relationship:

$$MAD2 - MAD1 = |a1-b2| - |a1-a2| > 0 \quad (4)$$

the object 154 can be searched for without detecting a background image in error.

Figure 13:
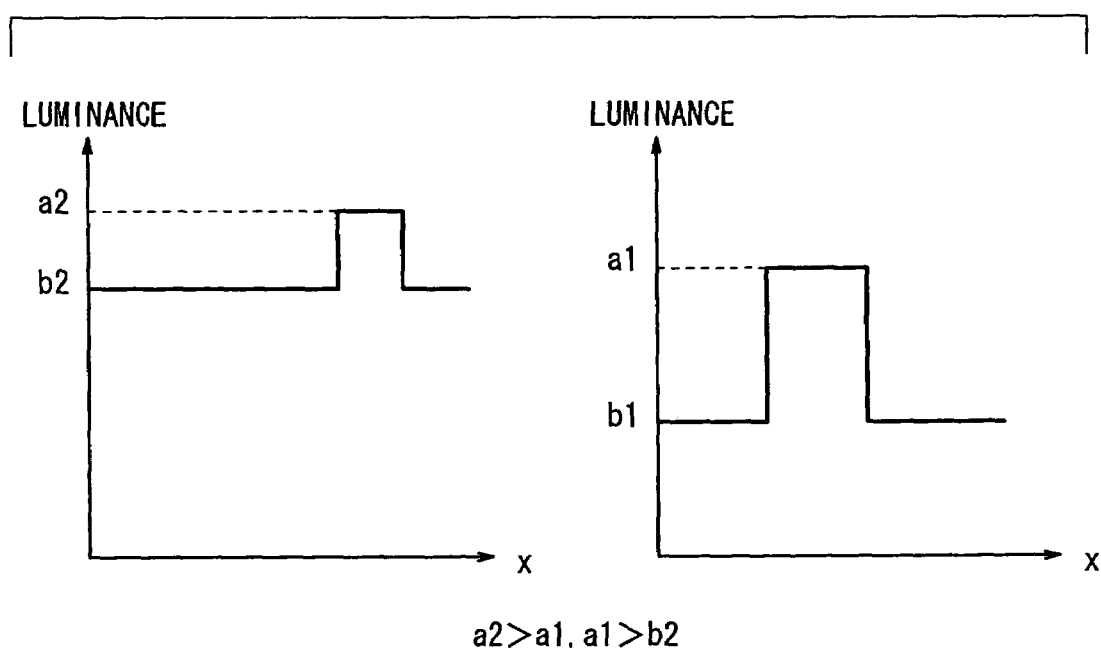
FIG. 13 is a diagram illustrative of a process of setting a luminance adjusting LUT.

If a1>b1, a2>b2, and a1>a2, then $$MAD2 - MAD1 = a2 - b2 > 0 \quad (5)$$

and the equation (4) is satisfied at all times (see FIG. 12). If a2>a1 and a1>b2, then the equation (4) is satisfied (see FIG. 13) only when $$MAD2 - MAD1 = 2 \cdot a1 - (a2+b2) > 0 \quad (6)$$

Figure 14:
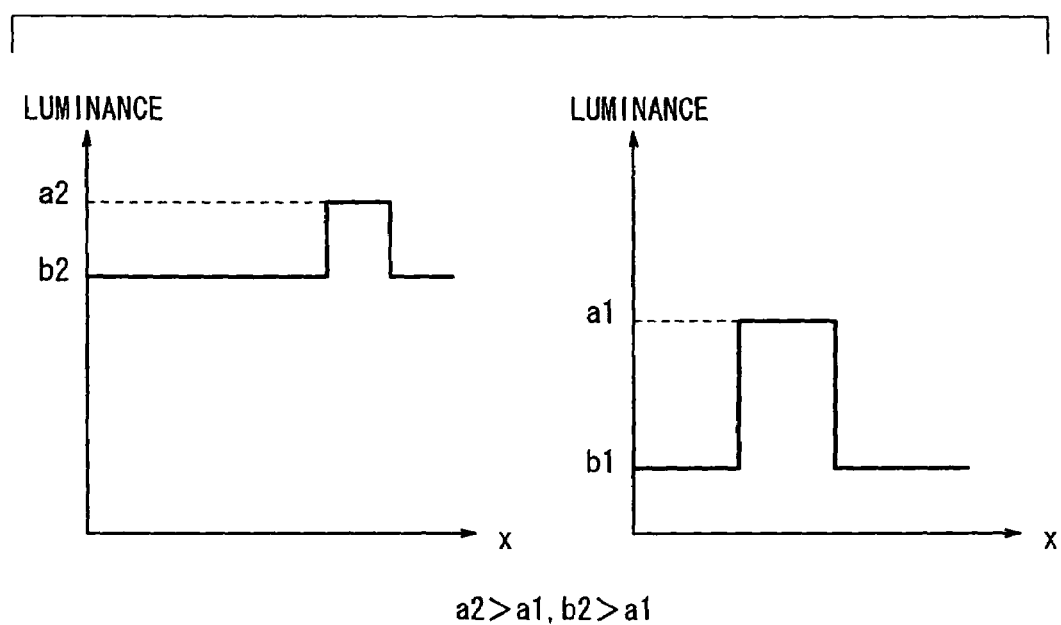
FIG. 14 is a diagram illustrative of a process of setting a luminance adjusting LUT.

If a2>a1 and b2>a1, then the equation (4) is satisfied when $$MAD2 - MAD1 = b2 - a2 > 0 \quad (7)$$

but the relationship b2>a2 never occurs (see FIG. 14).

Therefore, in order to be able to search for the object 154 at all times according to correlative calculations without detecting a background image in error, the luminance signal of the image obtained by the infrared camera 16R may be set so as to be greater at all times than the luminance signal of the same image obtained by the infrared camera 16L.

Figure 15:
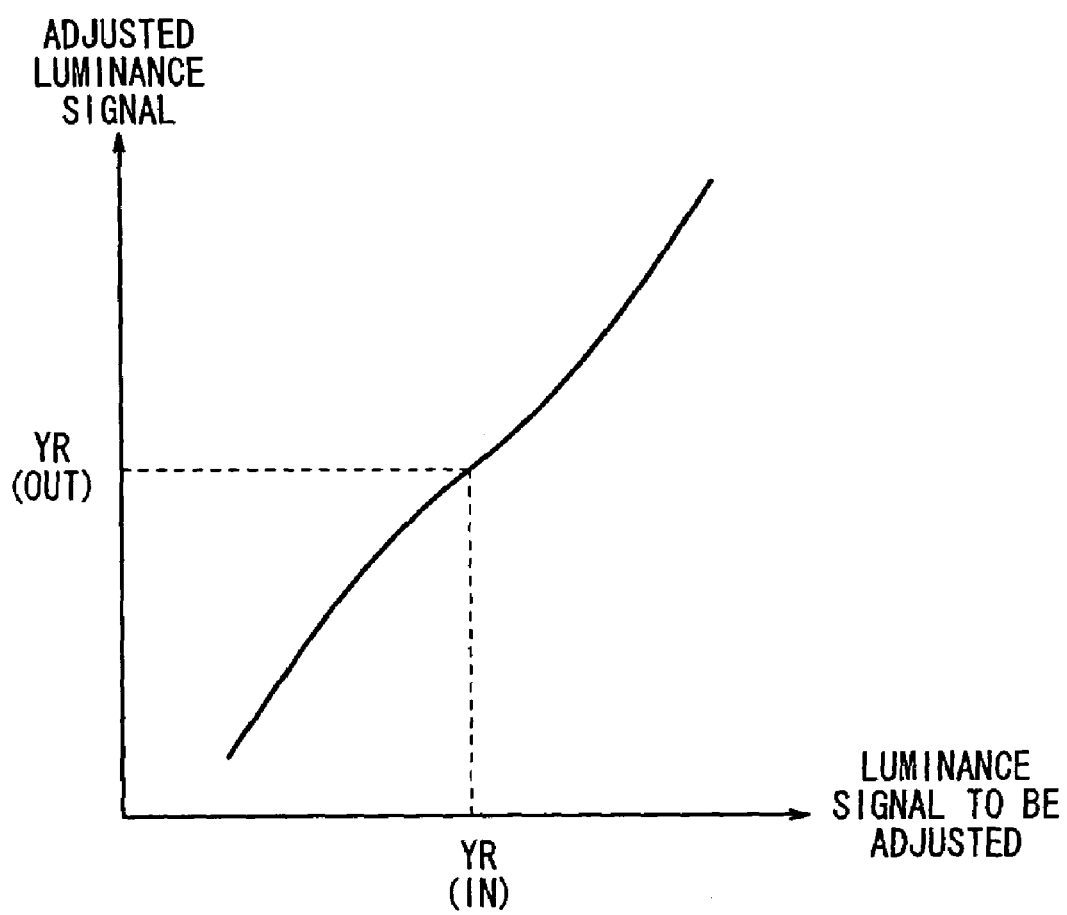
FIG. 15 is a diagram of a luminance adjusting LUT.

The luminance adjustment LUT setting unit 80 of the aiming mode execution unit 48 sets a luminance adjustment LUT for adjusting the luminance signal depending on the level, such that a luminance signal YR (IN) produced when the infrared camera 16R obtains an image of the aiming targets 112a through 112h or 134a through 134c is greater at all times than the luminance signal YL produced when the infrared camera 16L obtains an image of the aiming targets 112a through 112h or 134a through 134c, for example. Then, the luminance adjustment LUT setting unit 80 stores the set luminance adjustment LUT in the camera parameter memory 46 (see FIG. 15).

The luminance signal adjusting unit 142 adjusts the luminance signal YR (IN) from the infrared camera 16R, which is to be adjusted in luminance and which is read from the image memory 44, with the luminance adjustment LUT that is representative of a camera parameter, and outputs the adjusted luminance signal YR (IN) as a luminance signal YR (OUT) to the template matching unit 144. The template matching unit 144 performs correlative calculations on the adjusted luminance signal YR (OUT) from the infrared camera 16R and the luminance signal YL from the infrared camera 16L to search for the object 154. Since the relationship represented by the equation (4) is satisfied at all times, the object 154 is reliably searched for without detecting a background image in error.

The luminance adjustment LUT may be set by reading a gray scale having stepwise luminance levels as an aiming target through the infrared cameras 16R, 16L, and setting the obtained luminance signal YR (IN) so as to be greater than the luminance signal YL at each of the luminance levels. According to the luminance adjustment LUT, the luminance signal YL from the infrared camera 16L, which is to be adjusted in luminance and which is read from the image memory 44, may be adjusted so as to be smaller than the luminance signal YR from the infrared camera 16R. Alternatively, an aiming target having a single luminance level may be read by the infrared cameras 16R, 16L, a single corrective value may be set which is capable of making the luminance signal YR (IN) greater than the luminance signal YL in the full luminance range, and the luminance signal YR (IN) or YL may be adjusted using the single corrective value.

Figure 16:
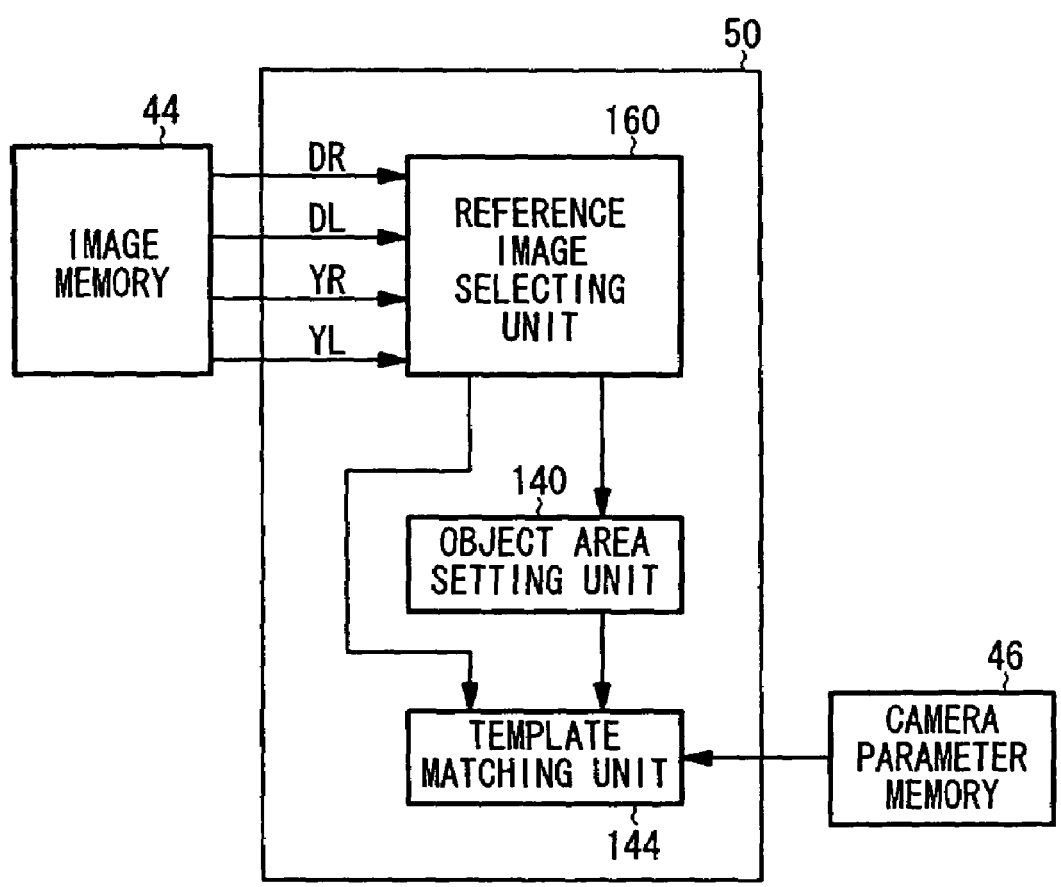
FIG. 16 is a block diagram of a normal mode execution unit according to another embodiment of present invention.

In FIG. 3, the infrared camera 16R is fixed as the reference imaging unit, and the luminance adjustment LUT is set using the image obtained by the infrared camera 16R as the reference image. However, as shown in FIG. 16, the luminance signal YR from the infrared camera 16R and the luminance signal YL form the infrared camera 16L may be compared with each other by a reference image selecting unit 160, and one of the infrared cameras 16R, 16L which produces a greater luminance signal may be selected as a reference imaging unit. The object area setting unit 140 may set an object area 150 according to the binary image DR or DL from the selected reference imaging unit, and correlative calculations may be performed by the template matching unit 144 using the gray-scale image YR or YL from the reference imaging unit as a reference image. According to the embodiment shown in FIG. 16, the object 154 can reliably be extracted without the need for adjusting the luminance of images.

Although certain preferred embodiments of the present invention have been shown and described in detail, it should be understood that various changes and modifications may be made therein without departing from the scope of the appended claims.

What is claimed is:

1. An apparatus for extracting an image of one object by comparing images obtained respectively by a plurality of imaging units, comprising:
    a luminance signal adjusting unit for using one of the imaging units as a reference imaging unit and another imaging unit than said reference imaging unit as a searching imaging unit, and adjusting a luminance signal from said reference imaging unit or said searching imaging unit such that the luminance signal of a reference image obtained by said reference imaging unit is greater by a predetermined amount than the luminance signal of a searching image obtained by said searching imaging unit;
    an object area setting unit for setting an object area including a particular object in said reference image;
    an image comparing unit for comparing an image of said object area and said searching image with each other; and
    an image extracting unit for extracting an image relating to said particular object from said searching image based on a comparison result from said image comparing unit;
    wherein said image comparing unit performs correlative calculations on said images, and said image extracting unit extracts an image for which the results of the correlative calculations are minimum as said image relating to said particular object;
    wherein said correlative calculations satisfy the equation $$MAD2-MAD1=a1-b2-a1-a2>0,$$

Where MAD1 is an evaluating value for the correlative calculations if the particular objects in the reference and searching images match each other, MAD2 is an evaluating value for the correlative calculations if the particular objects in the reference and searching images do not match each other, $a1$ is the luminance signal of the particular object obtained by the reference imaging unit, $b1$ is the luminance signal of the background around the particular object by the reference imaging unit, $a2$ is the luminance signal of the particular object obtained by the searching imaging unit, and $b2$ is the luminance signal of the background around the object by the searching imaging unit.

2. An apparatus according to claim 1, wherein said luminance signal adjusting unit has an adjustment table for adjusting said luminance signal of said reference image or said searching image obtained by said reference imaging unit or said searching imaging unit depending on the level of said luminance signal.

3. An apparatus according to claim 1, wherein said luminance signal adjusting unit has a single corrective value for adjusting said luminance signal of said reference image or said searching image obtained by said reference imaging unit or said searching imaging unit.

4. An apparatus according to claim 1, wherein said imaging units are mounted on a vehicle.

5. An apparatus according to claim 1, wherein said imaging units comprise infrared cameras for detecting infrared radiation radiated from said particular object.

6. An apparatus according to claim 1, wherein said luminance signal adjusting unit adjusts the luminance signal from said reference imaging unit or said searching imaging unit, such that the luminance signal of the particular object which has a luminance higher than that of a background in the reference image obtained by said reference imaging unit is greater than the luminance signal of the particular object in a searching image obtained by said searching imaging unit, and wherein said image comparing unit performs correlative calculations on the searching image and the object area set in the reference image, and said image extracting unit extracts an image for which the results of the correlative calculations are minimum as the image relating to the particular object from the searching image, based on a comparison result from said image comparing unit.

7. An apparatus according to claim 1, wherein said luminance signal adjusting unit adjusts the luminance signal from said reference imaging unit or said searching imaging unit, such that the luminance signal of the particular object which has a luminance higher than that of a background in the reference image obtained by said reference imaging unit is greater than the luminance signal of the particular object in a searching image obtained by said searching imaging unit so that the image of the particular object may be extracted from the searching image without recognizing a background image in error.

8. An apparatus according to claim 1, further comprising an image distortion correcting unit which corrects image distortions due to individual differences between the imaging units.

9. An apparatus for extracting an image of one object by comparing images obtained respectively by a plurality of imaging units, comprising:
- an image selecting unit for selecting one of the images obtained by said imaging units;
- an object area setting unit for setting an object area including a particular object in said image selected by said image selecting unit;
- an image comparing unit for comparing an image of said object area and another image than said selected image with each other; and
- an image extracting unit for extracting an image relating to said particular object from said other image based on a comparison result from said image comparing unit;
- wherein said image selecting unit selects an image having a greatest luminance signal from the images obtained by said imaging units;
- wherein said image comparing unit performs correlative calculations on said images, and said image extracting unit extracts an image for which the results of the correlative calculations are minimum as said image relating to said particular object.

10. An apparatus according to claim 9, wherein said imaging units are mounted on a vehicle.

11. A computer readable storage medium storing instructions that, when executed by a computer, cause the computer to perform a method of extracting an image of one object by comparing images obtained respectively by a plurality of imaging units, the method comprising the steps of:
- using one of said imaging units as a reference imaging unit and another imaging unit than said reference imaging unit as a searching imaging unit, and adjusting a luminance signal from said reference imaging unit or said searching imaging unit such that the luminance signal of a reference image obtained by said reference imaging unit is greater by a predetermined amount than the luminance signal of a searching image obtained by said searching imaging unit;
- setting an object area including a particular object in said reference image;
- comparing an image of said object area and said searching image with each other; and
- extracting an image relating to said particular object from said searching image based on a comparison result of said comparing step;
- wherein said image comparing unit performs correlative calculations on said images, and said image extracting unit extracts an image for which the results of the correlative calculations are minimum as said image relating to said particular object;
- wherein said correlative calculations satisfy the equation $$MAD2-MAD1=a1-b2-a1-a2>0.$$

where MAD1 is an evaluating value for the correlative calculations if the particular objects in the reference and searching images match each other MAD2 is an evaluating value for the correlative calculations if the particular objects in the reference and searching images do not match each other, a1 is the luminance signal of the particular object obtained by the reference imaging unit, b1 is the luminance signal of the background around the particular object by the reference imaging unit, a2 is the luminance signal of the particular object obtained by the searching imaging unit, and b2 is the luminance signal of the background around the object by the searching imaging unit.

12. A method according to claim 11, wherein said step of comparing comprises the step of performing correlative calculations on said image of said object area and said searching image, and said step of extracting comprises the step of extracting an image for which the results of the correlative calculations are minimum as said image relating to said particular object.

13. A computer readable storage medium storing instructions that, when executed by a computer, cause the computer to perform a method of extracting an image of one object by comparing images obtained respectively by a plurality of imaging units, the method comprising the steps of:
- selecting an image having a greatest luminance signal from the images obtained by said imaging units;
- setting an object area including a particular object in said selected image;
- comparing an image of said object area and another image than said selected image with each other; and
- extracting an image relating to said particular object from said other image based on a comparison result of said step of comparing;
- wherein said step of comparing comprises the step of performing correlative calculations on said image of said object area and said other image, and said step of extracting comprises the step of extracting an image for which the results of the correlative calculations are minimum as said image relating to said particular object.

* * * * *